(12) United States Patent
Jones et al.

(10) Patent No.: US 11,065,798 B2
(45) Date of Patent: Jul. 20, 2021

(54) APPARATUS AND METHOD FOR INJECTING A FLUID FORMULATION INTO A MELTED POLYMERIC MATERIAL

(71) Applicant: COLORMATRIX HOLDINGS, INC., Wilmington, DE (US)

(72) Inventors: Brian Jones, Merseyside (GB); David Whitehead, Merseyside (GB); Ian Campbell, Merseyside (GB); Harry Baker, Merseyside (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/758,911

(22) PCT Filed: Sep. 9, 2016

(86) PCT No.: PCT/IB2016/055381
§ 371 (c)(1),
(2) Date: Apr. 16, 2018

(87) PCT Pub. No.: WO2017/042726
PCT Pub. Date: Mar. 16, 2017

(65) Prior Publication Data
US 2019/0039276 A1 Feb. 7, 2019

(30) Foreign Application Priority Data

Sep. 11, 2015 (GB) .................. 1516143

(51) Int. Cl.
*B29C 48/285* (2019.01)
*F04C 11/00* (2006.01)
(Continued)

(52) U.S. Cl.
CPC ........... *B29C 48/286* (2019.02); *B29C 48/29* (2019.02); *F04C 2/1071* (2013.01);
(Continued)

(58) Field of Classification Search
CPC ... B29C 48/285; B29C 48/286; B29C 48/287; B29C 48/29; F04C 2240/60; B29K 2105/0032
See application file for complete search history.

(56) References Cited

U.S. PATENT DOCUMENTS 5,820,354 A * 10/1998 Wild .................. F04C 2/1071
417/244
7,278,776 B2 10/2007 Helbing et al.
(Continued)

FOREIGN PATENT DOCUMENTS

DE   2134105 A1   1/1972
EP   1682324 B1   7/2006
(Continued)

OTHER PUBLICATIONS

Liberty Process Equipment, "When To Use Progressive Cavity Pumps", http://www.libertyprocess.com/when_to_use_progressive_cavity_pumps.html, screen print from Aug. 7, 2013 using Wayback Machine (Year: 2013).*

(Continued)

*Primary Examiner* — Anthony Calandra
*Assistant Examiner* — Eric T Chen
(74) *Attorney, Agent, or Firm* — Fay Sharpe LLP

(57) ABSTRACT

Injection apparatus for injecting a liquid formulation into a molten polymer at high pressure includes a reservoir containing liquid formulation at ambient temperature and pressure which is arrange to flood-feed pump body 26 of a first progressing cavity pump (pcp) (4). The first pcp (4) is driven by motor (6) and is arranged to accurately meter the liquid formulation into a second pcp (8) which is downstream of the first pcp and is arranged to increase the pressure of the liquid formulation by 200 bar or more. Downstream of pump (8) is a delivery valve (14) arranged to control passage of (Continued)

liquid formulation, via outlet (17), into pressurised molten polymer stream (75) which is present in an extruder (77).

20 Claims, 3 Drawing Sheets

(51) Int. Cl.
    *B29C 48/29*     (2019.01)
    *F04C 2/107*     (2006.01)
    *F04C 13/00*     (2006.01)
    *F04C 14/24*     (2006.01)
    *B29K 105/00*     (2006.01)

(52) U.S. Cl.
    CPC .......... *F04C 11/001* (2013.01); *F04C 13/002* (2013.01); *F04C 14/24* (2013.01); *B29K 2105/0032* (2013.01); *F04C 2210/10* (2013.01); *F04C 2220/24* (2013.01)

(56) References Cited

U.S. PATENT DOCUMENTS

| | | | |
|---|---|---|---|
| 2003/0132994 A1* | 7/2003 | Samuels | B41F 31/08 347/85 |
| 2007/0182053 A1 | 8/2007 | Hoellein et al. | |
| 2011/0150687 A1 | 6/2011 | Ree | |
| 2014/0073006 A1 | 3/2014 | Zar | |
| 2016/0290334 A1* | 10/2016 | Overend | F04C 2/084 |

FOREIGN PATENT DOCUMENTS

| | | |
|---|---|---|
| EP | 2392740 A2 | 12/2011 |
| EP | 2700489 B1 | 2/2014 |
| FR | 2226269 A1 | 11/1974 |
| GB | 1311162 | 3/1973 |
| GB | 1411378 | 10/1975 |
| GB | 2005706 A | 4/1979 |
| JP | 8-290456 | 11/1996 |
| JP | 11-227029 | 8/1999 |
| JP | 2005059370 A | 3/2005 |
| JP | 2008273140 A | 11/2008 |
| WO | 9820259 A2 | 5/1998 |
| WO | 2005017003 A1 | 2/2005 |
| WO | 2013150456 A1 | 10/2013 |
| WO | 2014207472 A2 | 12/2014 |

OTHER PUBLICATIONS

International Search Report and Written Opinion for PCT/IB2016/055381.

\* cited by examiner

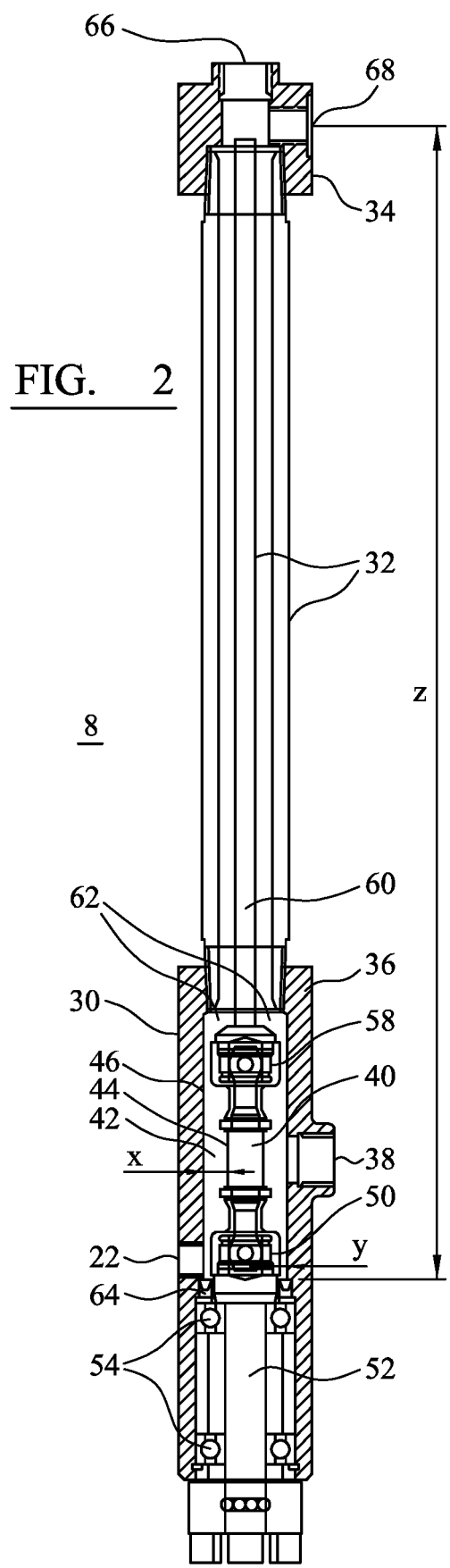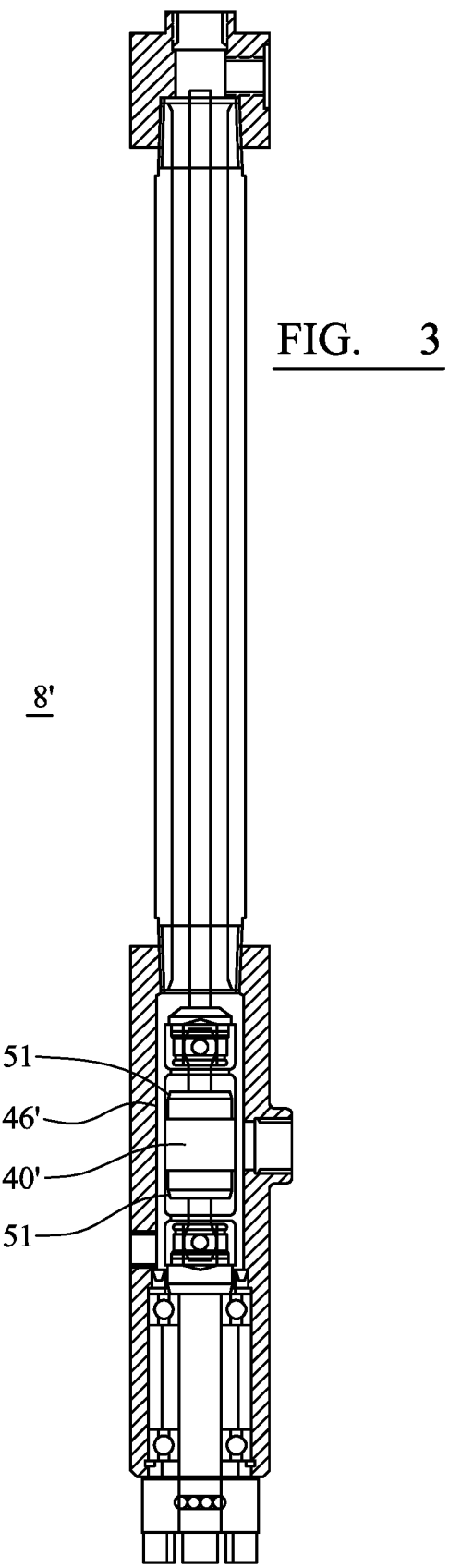

APPARATUS AND METHOD FOR INJECTING A FLUID FORMULATION INTO A MELTED POLYMERIC MATERIAL

This invention relates to polymeric materials and particularly, although not exclusively, relates to incorporation of additives into polymeric materials, for example polyesters, such as in polyester fibre production.

It is known to incorporate additives, (e.g. colorants, stabilizers, delusterants, anti-static agents, optical brighteners, processing aids etc.) into fibres post-production by bath dyeing or spin dyeing. However disadvantageously, this requires large volumes of liquid additive formulations to enable the additive to permeate into the fibre; the process can be time-consuming; and the fibre must be dried following the permeation process. Furthermore, the process of spin dyeing uses significant water resources and has been associated with environmental issues, including water-course pollution.

It is also known to use a masterbatch containing additives to introduce the additives into a polymer. For example, pellets of the masterbatch and pellets of the polymer may be introduced into an extruder via its feedthroat and the two components melt-processed together. Disadvantageously, however, cleaning of the extruder is time-consuming, since the entire length of the extruder needs cleaning between, for example colour changes; and dosing and handleability of solid pelletized masterbatch can be challenging. In addition, some properties of materials, for example spun fibre, made using masterbatches, may be detrimentally affected.

A preferred method of incorporating additives is incorporation of a liquid formulation into a polymer melt. The formulation suitably includes a vehicle in which the additive is dispersed prior to injection into the melt.

It is known to use gear pumps for injecting liquid formulations into a polymer melt. For example, U.S. Pat. No. 7,278,776 discloses an apparatus and method for injecting a liquid dye into a polymer melt. The apparatus for injecting the dye includes a tank for containing a liquid dye, wherein the tank is connected to a source of gas pressure so as to generate a gas cushion which acts upon the dye in the tank so the dye is delivered to an inlet of a feed pump under constant pressure. The feed pump, which is a gear pump, is connected to a dye feed line between the tank and an inlet of a metering pump which is also a gear pump. The metering pump has an inlet connected to the tank via the dye feed line and an outlet for connection to a melt carrying component, wherein the metering pump is configured to add measured quantities of dye from the tank to a polymer melt in the melt carrying component, for example an extruder.

WO2014/207472 discloses apparatus for injecting a fluid formulation into a melted polymeric material which also uses a gear pump.

Disadvantageously, it is found that gear pumps are susceptible to high levels of wear when liquid formulations which include abrasive particles, such as titanium dioxide are pumped. A worn gear pump, in general, cannot be cost-effectively refurbished (e.g. re-facing worn parts is expensive) so it may be replaced after it has become worn to such extent that its operation becomes unsatisfactory. The problem of wear of gear pumps may be addressed, to some extent, by milling such abrasive particles to very small particle sizes prior to incorporation into liquid formulations. However, this is time-consuming and costly; and some pigments, such as those intended to impart a metallic or pearlescent effect, must be maintained with relatively large particle sizes. In addition, it has been found in practice to be difficult to achieve satisfactory, long term performance using gear pumps, particularly when accurately metered quantities of liquid formulations need to be injected into molten polymeric material at a high pressure. One reason for this is due to the fact that gear pumps rely on very tight tolerances to achieve a mechanical seal between metallic components and thus generate pressure. However, very low viscosity materials cannot be adequately pressurised if the tolerances are widened to accept larger pigment particles. Furthermore, the action of a gear pump allows an amount of the liquid to 'slip' back over the gears when there is a differential in pressure between outlet and inlet. A small amount of 'slippage' can be accommodated but it will disadvantageously shear the liquid and will cause localised heating. Shear heating reduces the viscosity of most additive formulations and causes the 'slip' level to increase further, meaning that measures have to be implemented to combat heat build-up in the pump (e.g. air or liquid cooling). Increasing levels of 'slip' result in accelerated wear of the gear pump, meaning that more rotations of the pump are required for the same displacement volume and particulates are forced disadvantageously back through clearance gaps. Furthermore, some solid constituents can agglomerate into clumps or are pressed into larger lumps when subjected to mechanical pressures associated with the action of a gear pump, leading to problems when liquid formulations which include such clumps are injected into a polymer melt.

It is an object of the present invention to address the above described problems.

According to a first aspect of the invention, there is provided apparatus for injecting a fluid formulation into a melted polymeric material, the apparatus comprising a first progressing cavity pump (pcp) and a second pcp arranged in series in a fluid path upstream of an outlet of the apparatus.

Preferably, said first pcp is upstream of said second pcp. A first conduit is preferably provided between said first pcp and said second pcp. Said first conduit may have an inside diameter of less than 25 mm; and said inside diameter may be at least 1 mm.

Said first pcp is preferably arranged to feed (e.g. flood feed) liquid formulation into an inlet of the second pcp (suitably via said first conduit) at a pressure which is greater than atmospheric pressure. The pressure is suitably greater than 100 KPa (1 bar), preferably greater than 200 KPa (2 bar), more preferably greater than 250 KPa (2.5 bar). The pressure is suitably less than 1000 KPa (10 bar), preferably less than 500 KPa (5 bar). Use of such a pressure to introduce liquid formulation into the second pcp allows the second pcp to incorporate various advantageous features as hereinafter described.

Said second pcp suitably includes a pump body which includes an inlet via which liquid formulation may be introduced into the second pcp, suitably under pressure from said first pcp. The pump body includes a relatively small internal volume; the internal volume is suitably defined as the volume of the pump body (upstream of a rotor and stator assembly of the second pcp) which can contain liquid formulation introduced into the second pcp via its inlet. The internal volume of the second pcp may be less than 200 ml, preferably less than 150 ml, more preferably less than 120 ml. The internal volume may be at least 30 ml or at least 60 ml. A relatively small internal volume may be advantageous as discussed hereinafter.

The length of the internal volume may be less than 250 mm, preferably less than 200 mm and the width may be less than 75 mm, preferably less than 50 mm. Preferably, the length of the internal volume is in the range 75 mm to 200 mm and the width is in the range 15 mm to 60 mm.

The pump body suitably includes a link shaft operatively connected between a rotor/stator assembly of the second pcp and a motor of the pcp. The link shaft is suitably arranged to absorb torque and axial loads. It may have a width (for example maximum diameter) of less than 25 mm, for example less than 17 mm. Its width (for example maximum diameter) may be at least 5 mm. The width (e.g. maximum diameter) may be in the range 5 to 25 mm. Said link shaft may have a length of less than 250 mm, for example less than 180 mm. The link shaft suitably has the minimum possible length to effectively transmit the drive torque to the rotor of the rotor/stator assembly allowing for the fact that the rotor describes an eccentric path relative to the drive axis. Shortening the link shaft may be effective in reducing the internal volume of the second pcp. The link shaft may have a length of at least 20 mm. The length may be in the range 20 to 200 mm. The link shaft is suitably positioned between walls of the pump body which define the internal volume of the pcp which can contain liquid formulation. The link shaft suitably has a maximum width (or diameter when the link shaft has a circular cross-section as is preferred) measured perpendicular to its axis of rotation of "p" mm. The distance between said walls of the pump body (measured on the same line perpendicular to the axis of rotation of the link shaft) is "q" mm. The ratio of p/q is suitably at least 0.4, preferably at least 0.5, more preferably at least 0.55. It is suitably less than 0.9 or less than 0.8. In a preferred embodiment, the width of the link shaft (dimension "p") is in the range 80 to 180 mm. The clearance on both sides of the link shaft may be less than 12 mm, for example 10 mm or less; and it may be at least 1 mm.

The link shaft is suitably arranged to allow the rotor of the rotor/stator assembly to rotate eccentrically. One or more joints, for example universal joints, may be associated with the link shaft, for example to connect it to a rotor/stator assembly. The link shaft and joints are preferably designed as so to reduce the internal volume of the second pcp and maintain the most preferable distance "q" along the length of the pcp pump body.

The minimised internal volume of the pump body and a smooth and consistent shape along the length of the link shaft may serve to improve the ability of the second pcp to be flushed-through with a subsequent fluid formulation. The ability to flush and therefore operate multiple liquid formulations using one second pcp may serve to significantly reduce the cost of injecting multiple fluid formulations using the apparatus for injecting.

The second pcp can be flushed in-situ on the apparatus or may be removed to a separate flushing apparatus to be conditioned prior to subsequent use.

The second pcp may be flushed by feeding a second fluid formulation through the pump. The discharged material from the second pcp may be collected for disposal until the fluid formulation has sufficiently transitioned to the second fluid formulation. Alternatively, during the transition from a first fluid formulation to the second fluid formulation, the transitional fluid may continue to be delivered into melted polymeric material and the resultant end-product monitored until such time as the fluid formulation transition is complete and the manufactured product characteristics are consistent.

The second pcp may alternatively be removed from the apparatus and flushed away from the melted polymeric material. In this case, the second pcp may be removed from the apparatus along with a downstream delivery line and with a valve assembly arranged at a position of injection into melted polymeric material. The resultant, clean second pcp and associated parts thus returned can subsequently be primed with a new fluid formulation ready for immediate introduction into molten polymeric material.

Said pump body of said second pcp may include a pressure monitoring device (Q) (e.g. a pressure transducer) for monitoring the pressure of liquid formulation within the pump body. Device (Q) may extend through a wall of the pump body, for example within a bore 38 shown in FIG. 2.

Said second pcp suitably includes a rotor/stator assembly. Preferably, said pump body is releasably securable to said rotor/stator assembly.

Said rotor/stator assembly suitably includes multiple overlapping cavities. It suitably includes an elastomeric stator, for example a rubber (e.g. nitrile rubber) stator. It may include a metal, for example steel (e.g. stainless or chrome plated) rotor. Cavities of the pcp may have a volume in the range 0.05 ml to 1.2 ml, for example in the range 0.06 ml to 0.9 ml. Suitably, in use, one full cavity is typically discharged per revolution of the pump.

Said rotor/stator assembly may include at least 10 or at least 20 cavities. It may include 60 or more cavities. Suitably it includes less than 96 or less than 60 cavities. The volumes of all the cavities are preferably substantially identical.

Said rotor/stator assembly may have a length of less than 1000 mm, preferably less than 800 mm. The length may be at least 100 mm, suitably at least 400 mm. It may have a width (measured between outermost walls of the assembly) of less than 100 mm, for example less than 65 mm. The width may be at least 20 mm.

Said second pcp is suitably arranged to increase pressure by at least 10000 KPa (100 bar), more preferably by at least 15000 KPa (150 bar), especially by at least 19000 KPa (190 bar).

Said apparatus suitably includes a pressure monitoring device (R) (e.g. a pressure transducer) for monitoring the pressure of liquid formulation downstream of the rotor/stator assembly of the second pcp. The apparatus is suitably arranged such that pressure information from device (R) is communicable to a processing unit.

Said apparatus preferably (but not essentially) includes a pressure monitoring device (S) (e.g. a pressure transducer) for monitoring the pressure of liquid formulation upstream of said second pcp, for example to monitor the pressure of the liquid formulation immediately prior to entry of the liquid formulation into the second pcp. The apparatus is suitably arranged such that pressure information from device (S) is communicable to a or said processing unit.

Said apparatus preferably includes a valve downstream of the second pcp.

Said first pcp may include 2 to 20 cavities, preferably 4 to 12 cavities, more preferably 6 to 8 cavities. The cavities may have volumes in the range 0.05 ml to 1.2 ml, for example in the range 0.06 ml to 0.9 ml. Said first pcp suitably includes a rotor/stator assembly which includes an elastomeric stator, for example a rubber (e.g. nitrile rubber) stator. It may include a metal, for example steel (e.g. stainless or chrome plated) rotor.

The ratio of the number of cavities of the rotor/stator assembly of the second pcp divided by the number of cavities of the first pcp may be at least 6, preferably at least 8. It may be less than 20 or less than 15.

Preferably, said first pcp is provided upstream of the second pcp and a reservoir is suitably upstream of the first pcp, with the reservoir being suitably connected to the first pcp via a second conduit, which may have an inside diameter in the range 4 to 20 mm. The second conduit preferably provides an uninterrupted fluid connection between said reservoir and first pcp. The first conduit described suitably extends between the first pcp and second pcp for passage of fluid formulation from the first pcp to the second pcp.

The reservoir is preferably arranged to deliver fluid formulation to the inlet of the first pcp at a pressure of less than 1.2 bar. Said reservoir is preferably open to atmospheric pressure. Said reservoir is preferably not separately pressurized. Suitably, the apparatus is arranged such that the pressure at the inlet of the first pcp is defined by the static head of fluid in the reservoir and atmospheric pressure and no additional means is provided for pressurizing the reservoir. Preferably, the reservoir and first pcp are arranged for flooded suction of the first pump, with fluid from the reservoir—i.e. fluid from the reservoir is effectively "poured" into the first pcp.

The reservoir may have a volume in the range 1 to 50 litres, preferably 1 to 20 litres, more preferably 1 to 10 litres. In order to change the identity (e.g. colour) of a fluid formulation injected by the apparatus, the first pcp and the reservoir (including fluid formulation contained therein) may be disengaged and removed from other parts of the apparatus. To enable this to be done by one person, the reservoir suitably has the preferred volume described.

Said apparatus preferably includes a storage container for fluid formulation, wherein said storage container is arranged to deliver fluid formulation into said reservoir. Said storage container may be supplied by a manufacturer of the liquid formulation. It may have a volume of at least 10 litres, preferably at least 20 litres. The volume may be less than 100 litres. The volume of the storage container is preferably the same as or, more preferably, greater than the volume of the reservoir.

The reservoir may contain a fluid formulation having any feature of the fluid formulation hereinafter described.

The storage container may contain a fluid formulation having any feature of the fluid formulation hereinafter described.

The reservoir and storage container preferably contain the same fluid formulation.

The apparatus may be arranged to control said first pcp, for example the speed thereof, in dependence upon the amount of fluid formulation which it is desired to inject into the melted polymeric material. Suitably, the function of the first pcp is to meter the liquid formulation in accordance with the parameters set on a or said processing unit.

The apparatus may be arranged to control said second pcp, for example the speed thereof automatically in dependence upon the pressure assessed, by for example said pressure monitoring device (S). Suitably the function of the second pcp is to increase the pressure of the liquid formulation such that the liquid formulation can be injected into melted polymeric material, Suitably, the pressure at the inlet of the second pcp as assessed by pressure monitoring device (S) is maintained at a consistent and pre-determined setpoint, via a or said processing unit.

Said first pcp and said second pcp are preferably independently operable. Preferably, the speed of the first pcp can be adjusted independently of the speed of the second pcp; and preferably the speed of the second pcp can be adjusted independently of the speed of the first pcp.

Between said reservoir and said outlet of the apparatus via which fluid formulation may be delivered into a melted polymeric material, said apparatus preferably includes only two pumps—said first pcp and said second pcp.

Said outlet of said apparatus may suitably be for connection to a melt processing apparatus, suitably so the fluid formulation can be introduced, for example injected, into a melt stream produced by said melt processing apparatus. Said apparatus may include a valve, downstream of the second pcp, for controlling flow of fluid formulation into the melt stream.

The valve may be controlled by a processing unit, for example said processing unit which receives information from said first and second pressure sensors.

Preferably, said apparatus for injecting is provided in combination with a melt processing apparatus, suitably to define an assembly, wherein said outlet of the apparatus for injecting is in fluid communication with an inlet via which fluid formulation can be introduced into a melt stream produced by said melt processing apparatus.

In the combination comprising apparatus for injecting and said melt processing apparatus, pressure monitoring device (T) is preferably (but not essentially) provided for monitoring the pressure of the melt stream, suitably adjacent the position of injection of fluid formulation into the melt stream. Information relating to said pressure is suitably arranged to be communicated to said apparatus for injecting, for example to a or said processing unit thereof.

In one embodiment, the apparatus for injecting may be arranged to track the pressure of the melt stream with which it is hydraulically linked. The valve controlling the liquid formulation injection is suitably opened by a or said processing unit when the pressure as assessed by pressure monitoring device (R) reaches a pre-determined pressure-level. This may be at or slightly above the polymer pressure as assessed by the pressure monitoring device (T). Once the valve is open, the polymer stream and the liquid formulation injection system are hydraulically linked and the pressure monitored by devices (R) and (T) will remain closely linked; and suitably the injection system will automatically track the polymer stream pressure. The or said processing unit will suitably modulate the speed of the second pcp to maintain a consistent pressure assessment by the pressure monitoring device (S).

In another embodiment, the apparatus for injecting may be arranged to open the valve controlling the liquid formulation at a pressure set directly on a or said processing unit. Once the valve is open, the polymer stream and the liquid formulation injection system are hydraulically linked and the pressure monitored by devices (R) and (T) will remain closely linked. The or said processing unit may modulate the speed of the second pcp to maintain a consistent pressure assessment by the device (S).

The apparatus for injecting, for example a or said processing unit thereof, may receive periodic feedback on the pressure of the melt stream and the apparatus, for example a or said processing unit, is suitably programmed to monitor the pressure of injection, compare with the assessed polymer melt pressure or programmed pressure range limits and feedback to the operator accordingly. Significant deviation between liquid formulation pressure and melt-stream pressure (monitored or programmed) may be used as indicators of incorrect functioning and trigger a system alarm or controlled injection system shutdown.

In said combination comprising apparatus for injecting and said melt processing apparatus, a mixing means is suitably provided for facilitating mixing of the liquid formulation and polymeric material. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres.

A or said processing unit of said apparatus for injecting is suitably arranged to operate said first pcp so that the pressure difference between the inlet and outlet of the first pcp is less than 8 bar, for example less than 5 bar or less than 3 bar. In this case, the first pcp may be arranged not to significantly increase the pressure of the fluid formulation in use. The primary function of the first pcp may be to meter formulation. The second pcp may be operated, suitably under control of said processing unit, to significantly increase pressure of the fluid formulation in use. Thus, the processing unit of said apparatus is suitably arranged to operate said second pcp so that the pressure difference between its inlet and outlet is greater than 10000 KPa or greater than 15000 KPa. The processing unit may also control metering by the first pcp by maintaining the pressure immediately downstream of the first pcp substantially constant.

As described, the apparatus suitably includes a processing unit for controlling and/or monitoring the first pcp and second pcp. The processing unit is suitably arranged to receive information from pressure monitoring devices (S) and (R), suitably as described above, to monitor pressure at the inlet and outlet of the second pcp. Said processing unit may be arranged to receive information from the melt processing apparatus with which the apparatus for injecting is suitably associated. For example, information on pressure of the melt stream is suitably communicated to the processing unit. Information on the flow rate of the melt stream may also be communicated to the processing unit. Information on the state of a valve downstream of the second pcp may be communicated to the processing unit.

The apparatus suitably includes a user interface by means of which a user may input process information. For example, one or more of the following may be input by a user: melt processing apparatus throughput, injection point pressure and LDR (Let-Down-Ratio).

In said apparatus, said second pcp may be mounted in an upright position, for example vertically. Said first pcp may be mounted in an upright position, for example vertically.

Said first and second pcps may be mounted on a vehicle. The vehicle may be arranged to support a reservoir which contains liquid formulation. Preferably, the vehicle supports a reservoir containing liquid formulation. The vehicle may be arranged to be rolled to a position in which it is to be used, for example a position adjacent a melt-processing apparatus. The vehicle may include wheels or rollers (e.g. at least three, preferably at least four wheels or rollers). The vehicle may include a support structure on which the first and second pcps are mounted (preferably so the pcps are demountable). The first pcp may extend upwardly (i.e. the elongate axis of the pcp extends upwardly), for example substantially vertically upwardly from the support structure. Said second pcp may extend upwardly (i.e. the elongate axis of the pcp extends upwardly, for example vertically upwardly) from the support structure. A processing unit, suitably arranged to control operation of the first and second pcps, is preferably a component of the vehicle and/or is fixed relative to the support structure. The vehicle preferably has a height of less than 1.8 m. The footprint of the vehicle may be less than 2 $m^2$ or less than 1 $m^2$; and it may be at least 0.2 $m^2$. Thus, it will be appreciated that, by virtue of the design of various components of the apparatus, a relatively compact arrangement can be configured on a vehicle such that the vehicle can readily be assembled and/or moved by a single operator to where it may be used.

The apparatus described may be easily modified to inject, into melted polymeric material, at higher or lower pressures; or higher or lower additive levels; or higher or lower polymer throughput rates. To this end, the apparatus may include two of said second pcps or include one second pcp (referred to as second pcp (A)) and a separate rotor/stator-assembly arranged to be interchanged with the rotor/stator-assembly of second pcp (A). Then, the apparatus is suitably arranged to define two different second pcps. One second pcp may be arranged to increase pressure by less than the other second pcp. One second pcp may include fewer cavities (e.g. at least 6 or at least 12 fewer cavities) than the other second pcp.

Advantageously, when the apparatus comprises a vehicle on which the pcp is mounted as described, the vehicle may be arranged so that said one second pcp and another second pcp may be interchangeably mounted on the vehicle. By providing a means for interchanging two second pcps (or components thereof), the versatility of the apparatus may be improved. For example, it may facilitate changing the identity (e.g. colour) of liquid formulations injected using the apparatus, in a rapid manner, without the need for a complete clean-down of the apparatus. A removed second pcp may be stored, for example still containing liquid formulation, after it has been interchanged as described.

In some embodiments, the apparatus may include two of said first pcps which are interchangeable; for example on the vehicle. Again, this may facilitate the change of identity of a liquid formulation injected using the apparatus. A removed first pcp may be stored, for example still containing liquid formulation, after it has been interchanged as described.

According to a second aspect of the invention, there is provided a method of injecting a fluid formulation into melted polymeric material, the method comprising:

(i) selecting apparatus comprising a first pcp and a second pcp in series in a fluid path between a reservoir containing the fluid formulation to be injected and an outlet;

(ii) operating the second pcp to increase the pressure of the formulation passing between the reservoir and said outlet; and (iii) injecting said formulation into melted polymeric material downstream of said outlet.

The apparatus may have any feature of the apparatus of the first aspect.

In step (ii), said second pcp may be operated to increase the pressure of the formulation by at least 10000 KPa (100 bar), preferably at least 15000 KPa (150 bar), more preferably at least 19000 KPa (190 bar).

In step (iii), said formulation may be injected at a pressure of at least 10000 KPa (100 bar), preferably at least 15000 KPa (150 bar), more preferably at least 19000 KPa (190 bar).

The method preferably comprises said first pcp metering the liquid formulation. That is, it may control the volume per unit time of formulation exiting the first pcp, so that a predetermined volume per unit time of formulation exits the first pcp and/or enters the second pcp. Said first pcp is suitably operated to increase the pressure of the liquid formulation by less than 800 KPa (8 bar), less than 500 KPa (5 bar) or less than 300 KPa (3 bar).

The method preferably comprises introducing liquid formulation into said second pcp at a pressure above ambient pressure. The liquid formulation may be introduced into the second pcp at a pressure of at least 150 KPa (1.5 bar), preferably at least 200 KPa (2.0 bar), more preferably at least 250 KPa (2.5 bar). It may be introduced at a pressure less than 1000 KPa (10 bar), preferably less than 500 KPa (5 bar). Preferably, for at least 90% (preferably at least 99%) of the time during which said formulation is injected into melted polymeric material, the pressure of introduction of liquid formulation into the second pcp is at a pressure in the range 150 KPa (1.5 bar) to 1000 KPa (10 bar), more preferably in the range 150 KPa (1.5 bar) to 500 KPa (5 bar).

The method preferably comprises maintaining the pressure of the liquid formulation at a position between the first and second pcps substantially constant for at least 5 minutes, preferably at least 30 minutes, more preferably for substantially the entire time period over which liquid formulation is injected into melted polymeric material, suitably thereby to accurately meter formulation.

The method preferably comprises, in step (iii), maintaining the rate of injection of said formulation into melted polymeric material over a period of at least 5 minutes or preferably over at least 30 minutes. The rate of injection may be at least 0.5 ml/minute; it may be less than 400 ml/minute.

The method may comprise operating the first pcp at a rotational speed of 5-100 rpm, preferably 10-50 rpm.

The method may comprise operating the second pcp at a rotational speed of at least 5 rpm. The speed may be at least 200 rpm and, preferably, is less than 1000 rpm. The ratio of the speed of the second pcp divided by the speed of the first pcp may be at least 3; and it may be less than 100 or less than 80.

Advantageously, the method may be used to dose relatively viscous formulations which have high loadings of relatively large particles.

Unless otherwise stated, viscosity described herein may be measured using a Brookfield Viscometer at 20 rpm and 23° C.

Said fluid formulation may have a viscosity of at least 5000 cP, suitably at least 10000 cP, preferably at least 15000 cP. The viscosity may be less than 45,000 cP, preferably less than 40,000 cP, more preferably less than 35,000 cP.

Said fluid formulation may include at least 20 wt %, suitably at least 30 wt %, preferably at least 40 wt %, more preferably at least 50 wt %, especially at least 60 wt %, solids. Said solids may comprise particulate material, for example solid pigments and/or dyes. Said fluid formulation may include 85 wt % or less of solids of the type described. Said fluid formulation suitably includes 15 to 70 wt %, preferably 15 to 50 wt % of fluid, for example liquid. Said solids are suitably provided as a dispersion in a fluid which is suitably a vehicle. Thus, the solids may be generally insoluble in the vehicle. The ability to use highly loaded formulations (and consequently relatively low vehicle levels) may be advantageous in minimizing any detrimental effect associated with incorporation of vehicle into the polymeric material.

Said solids may be arranged to adjust a property of a plastics material into which they may be delivered by the apparatus. Said solids may comprise any material that it is desired to introduce into a plastics material and may be selected from colourants, UV filters, oxygen absorbers, antimicrobial agents, acetaldehyde scavengers, reheat additives, antioxidants, light stabilizers, optical brighteners, processing stabilizers and flame retardants. Colourants may comprise pigments or dyes.

Said solids preferably comprise insoluble colourants (i.e. insoluble in the vehicle), for example insoluble pigments or dyes.

Said vehicle is suitably a liquid at STP. Said fluid formulation is preferably a liquid at STP. Said vehicle preferably has a boiling point (at atmospheric pressure of 760 mmHg) of greater than 300° C., preferably greater than 350° C., more preferably greater than 500° C. The boiling point may be less than 1150° C. or less than 1000° C. The melting point of the vehicle may be less than 0° C. or less than −10° C.

Said vehicle is preferably a liquid vehicle. Illustrative liquid vehicles include but are not limited to: mineral oils, C9-C22 fatty acid esters, ethoxylated C9-C22 fatty acid esters, ethoxylated alcohols and plasticizers. Plasticizers may for example be sebacates and azelates, such as dibutyl sebacate, esters such as benzyl benzoate, adipates such as dioctyladipate, citrates such as triethyl citrate, epoxies, phosphate esters such as 2-ethylhexyl diphenyl phosphate, phthalates such as dioctylphthalate, and secondary plasticisers such as chlorinated paraffins.

The sizes of particles in said fluid formulation may be assessed using optical microscopy. Suitably less than 5%, less than 1% or less than 0.1% of the number of particles in the fluid formulation have a maximum particle size of greater than 250 µm or greater than 150 µm. At least 10% of the number of particles in the fluid formulation may have a maximum particle size greater than 10 µm, or greater than 20 µm or greater than 30 µm or greater than 40 µm.

The fluid formulation may include particles having a 5 µm or greater median particle diameter. The median particle diameter may be 100 µm or less. As used herein, a d50 particle size is the median diameter, where 50% of the volume is composed of particles larger than the stated d50, and 50% of the volume is composed of particles smaller than the stated d50 value. As used herein, the median particle size is the same as the d50 particle size. In the aforementioned the particle sizes and/or median diameter may be assessed by laser diffraction, for example using a Horiba LA950 Laser Particle Size Analyzer.

The method may be advantageously used for injecting fluid formulations which include relatively large and/or relatively abrasive additives. For example, the fluid formulation may include a laminar or plate-like material, for example a laminar or plate-like pigment. The additive may be an effect material selected to provide a pearly or nacreous lustre or a granite, marble, holographic or glitter-like effect. The additive may comprise a metal oxide. The additive may be selected from metal oxide coated mica pigments or metal flake pigments (e.g. selected from aluminium flake pigments, iron flake, stainless steel flake, gold bronze pigments and zinc pigments).

Said formulation is suitably injected at a rate of 1 to 1500 ml/minute, preferably a rate of 3 to 750 ml/minute, more preferably a rate of 10 to 500 ml/minute.

The method may comprise an operator selecting a parameter relating to the amount of said fluid formulation to be dosed into the said polymeric material and inputting information relating to said parameter into a processing unit which controls operation of the apparatus to inject said formulation into said melted polymeric material in accordance with said parameter. Said parameter may relate to a desired dose rate of said fluid formulation into said polymeric material. The method may comprise an operator selecting an inlet pressure of liquid formulation into the second pcp.

Preferably, after contact between said formulation and said polymeric material, the mixture includes less than 15 wt % (for example less than 10 wt %) of material derived from said formulation and greater than 85 wt % (for example greater than 90 wt %) of melted polymeric material with which the formulation is contacted in the method.

Preferably, formulation is selected and injected at a rate which introduces less than 15 wt %, more preferably less than 10 wt %, or less than 8 wt % of vehicle into the melted polymeric material. That is, after contact between formulation and melted polymeric material, the amount of vehicle in the mixture is preferably less than 15 wt %, less than 10 wt % or less than 8 wt %. Preferably, after contact between formulation and melted polymeric material, the sum of the amounts of all liquids introduced into the polymeric material via said formulation is less than 15 wt %, less than 10 wt % or less than 8 wt %, based on the total weight of mixture comprising said formulation and said melted polymeric material after said contact.

Said polymeric material may be selected from polyesters (especially PET), polycarbonates and polyolefins. Said polymeric material is preferably a polyester, more preferably PET.

Downstream of contact between said formulation and said polymeric material, the mixture may be used to form sheet or fibre; or other articles in extrusion or blow moulding processes.

The method of the second aspect may comprise selecting one second pcp from at least two options. Thus, there may be provided two optional second pcps; or there may be provided one second pcp (referred to as second pcp (A) and apparatus for converting said second pcp (A) into a different second pcp, for example a second pcp capable of generating higher or lower pressure (e.g. by having more or fewer cavities) compared to pcp (A). Second pcp (A) may be arranged to be converted into a different second pcp by replacing the rotor/stator assembly of the second pcp (A) with an alternative rotor/stator assembly which has more or fewer cavities than the rotor/stator assembly replaced.

The method of the second aspect may comprise, prior to step (ii), selecting an apparatus comprising a vehicle on which the first and second pcps are mounted and moving the vehicle from a first position towards a second position spaced from the first position, wherein said second position is adjacent a melt-processing apparatus which is to contain melted polymeric material into which said formulation is to be injected in step (iii).

In a third aspect, there is provided the use of apparatus of the first aspect for injecting a fluid formulation into melted polymeric material.

The melted polymeric material may be spun into fibre, for example having a length in excess of 10 m.

The use of the third aspect may involve injecting a fluid formulation into melted polymeric material as described in the second aspect.

Specific embodiments of the invention will now be described, by way of example, with reference to the accompanying drawings, in which:

FIG. 2 is a cross-section through a progressing cavity pump (pcp) which is arranged to increase pressure of the liquid formulation prior to injection into the molten polymer; and FIG. 3 is a cross-section through an alternative pcp to that of FIG. 2;

In the figures, the same or similar parts are annotated with the same reference numerals.

Figure 1:
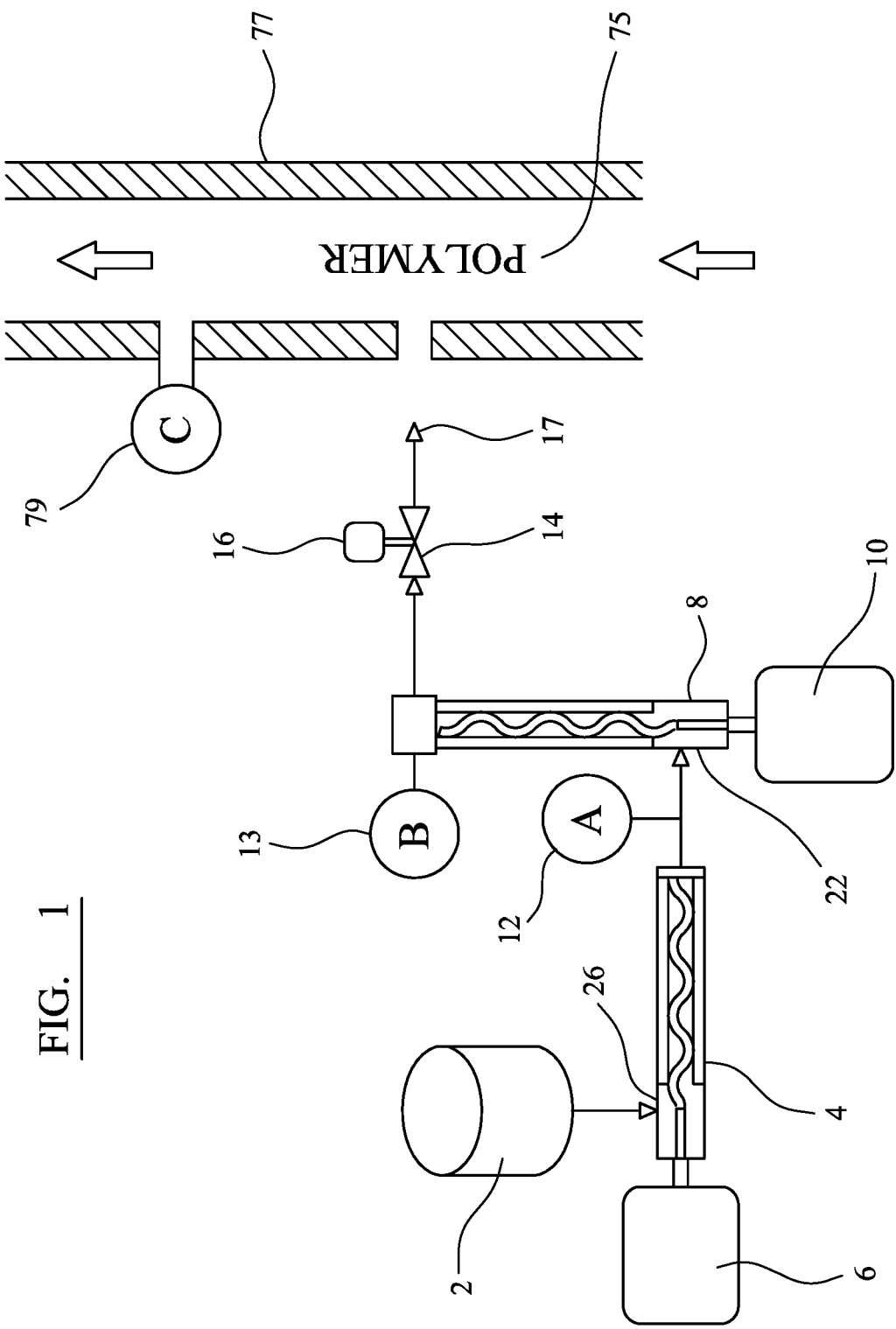
FIG. 1 is a schematic representation of apparatus for injecting a liquid formulation into molten polymer.

Injection apparatus for injecting a liquid formulation into a molten polymer, at high pressure, is shown in FIG. 1. The apparatus includes a reservoir 2 which contains the liquid formulation at ambient temperature and pressure and is arranged to flood feed pump body 26 of a first progressing cavity pump (pcp) 4. The first pcp 4 is driven by a motor 6 and is arranged to accurately meter the liquid formulation into a second pcp 8 which is downstream of the first pcp, is driven by a motor 10 and is arranged to increase the pressure of the liquid formulation by 200 bar or more. A pressure transducer 12 is positioned in a flow line between the first and second pcps 4, 8.

Adjacent an outlet of the second pcp 8 is provided a second pressure transducer 13 which is arranged to monitor pressure of fluid exiting the second pcp 8.

Downstream of pump 8 is a delivery valve 14, controlled by an actuator 16 and arranged to control passage of liquid formulation, via its outlet 17, into a pressurized molten polymer stream 75 which is present within an extruder 77 provided downstream of outlet 17. The extruder includes an associated pressure transducer 79 for monitoring the pressure of the polymer stream.

In use, the apparatus is controlled so the first pcp acts as a metering pump. It is driven to deliver a continuous stream of the liquid formulation accurately and in accordance with the real-time throughput of the polymer in the extruder 77, thereby to accurately delivery liquid formulation, including relevant additives, into the polymer, prior to the polymer being extruded into products such as sheet products, profile products and textile filaments.

Pressure within the pressurized molten polymer stream within the extruder will be significantly greater than the pressure which is deliverable by the first pcp 4. So, when the apparatus is initially operated, delivery valve 14 is closed and therefore isolates the apparatus from the pressurized molten polymer stream. First pcp 4 is operated to meter liquid formulation against inlet 22 (shown more clearly in FIG. 2) of the second pcp 8, with the pressure between first and second pumps 4, 8 being monitored by pressure transducer 12. The pressure is allowed to rise at pressure transducer 12 until a pre-set pressure is achieved. This pre-set pressure is relatively low and is selected to match the preferred discharge pressure capability of pump 4. It is typically 2-3 bar.

Once the pre-set pressure is reached, the second pcp 8 is driven by motor 10 to convey liquid formulation away from pressure transducer 12/inlet 22, while maintaining the pre-set pressure as measured by pressure transducer 12. The speed of motor 10 is continuously adjusted using a proportional-integral-derivative (P.I.D.) loop control to maintain the pre-set pressure at transducer 12 as accurately as possible, since it is found that maintaining a constant and actively controlled discharge pressure of the first pump 4 optimises the metering accuracy of the pump 4.

As pump 8 conveys liquid formulation away from pump 4, pressure is generated against the closed valve 14. The pressure is monitored by second pressure transducer 13. Valve 14 remains closed until the pressure at transducer 13 is equal to or slightly above the pressure of the molten polymer stream in the extruder 77. The pressure of the molten polymer may be assessed by a further pressure transducer 79 positioned close to outlet 17. Alternatively, the pressure of the polymer may be known for a given set of polymer processing conditions and then programmed into the injection apparatus.

Once the pressure of the liquid formulation at transducer 13 reaches a suitable level (i.e. at or above the pressure of the molten polymer stream), actuator 16 is operated to open delivery valve 14, thereby allowing liquid formulation to flow into the molten polymer stream. Consequently, the pressure of the liquid formulation at transducer 13 will immediately equalise with the pressure of the molten polymer stream in the extruder 77 at the position of injection. During this time, the rotational speed of pump 8 will be modulated as required to maintain the pre-set pressure at transducer 12.

By using P.I.D. loop control to maintain pressure at transducer 12, the injection apparatus may quickly automatically adjust to changes in the molten polymer stream in the extruder 77.

Pump 8 may slip slightly at high pressure (e.g. approaching 200 bar) so the rotational speed of the pump can be varied independently of the delivery rate. In addition, the pressure of the molten polymer stream may fluctuate during a run. To maintain the delivery of a constant volume of liquid formulation into the molten polymer stream, it may be necessary for the pump 8 to be controlled to increase or decrease its speed. Also, the throughput of the molten polymer stream may also change, in which case the metering pump 4 will be controlled to adjust its running speed accordingly and pump 8 will be adjusted as necessary to maintain pressure at transducer 12.

Further details on parts of the apparatus are provided below.

Reservoir 2 containing liquid formulation to be injected into the polymer may comprise a plastic container, for example a bag-in-a-box container, having a volume in the range 2.5 to 15 litres. It is suitably not pressurized but is open to the atmosphere and is arranged to gravity feed liquid into pump body 26 of pcp 4.

Pcp 4 may be a relatively light weight pcp, having a pressure discharge capacity of 2 or 3 bar. It preferably includes 4 or 6 or more cavities of substantially identical volumes, wherein the cavities volume is 0.08 ml, 0.24 ml, 0.8 ml or 2.6 ml. As described above, it acts as a metering pump in the injection apparatus by controlling, via the PID controller, the pressure generated (as monitored by transducer 12) and/or its speed. The pressure of liquid formulation is increased only a relatively small amount by pump 4 (e.g. to about 2 to 3 bar). However, it is advantageous that the pressure is raised by pump 4 and that the pressure of liquid formulation on entry into pump 8 is a few bars above ambient pressure, since this allows pump 8 to be provided in a more compact form as described hereinafter.

Pump 8 is shown in detail in FIG. 2. It comprises a pump body 30, a rotor/stator assembly 32 and a discharge end 34. Each component is described in further detail below.

The pump body 30 is advantageously modified compared to general purpose known pcps. The body 30 includes a circular, internal cross-section housing 36 which includes inlet 22 for receiving liquid formulation which has been metered by pump 4. Housing 36 also includes a bore 38 which may receive a pressure transducer (not shown) for monitoring the pressure of liquid formulation in the pump body. This pressure transducer suitably replaces transducer 12 shown in FIG. 1. Having the transducer mounted in the pump body means the transducer is removed along with the pump 8 when it is exchanged (e.g. as part of a colour change) which facilitates a quick, clean exchange of the pump 8.

The housing 36 is constructed so its internal volume 42 (which can contain liquid formulation introduced into the housing via inlet 22) is minimised. In a preferred embodiment, the total capacity of the housing for containing liquid formulation is only about 100 ml. Note the "total capacity" equals the total amount of liquid formulation which can be contained within the housing, allowing for the fact the housing includes solid bodies (e.g. a link shaft, couplings and joints as herein described) which reduce the volume available to contain liquid formulation. It is advantageous to minimise the total capacity for several reasons. One reason is associated with reducing the amount of liquid formulation which may be wasted in the event it is necessary or desirable to clean the housing 36, for example when an alternative liquid formulation is to be delivered by the injection apparatus. Another reason may be associated with a preference to minimise the volume of unused liquid formulation. For example, body 30 containing liquid formulation may be disengaged from other parts of the injection apparatus and replaced with an alternative body 30 containing (or to be used with) an alternative liquid formulation. The disengaged body 30 may then be stored for subsequent use. It is desirable to minimise the volume of stored liquid formulation from a cost perspective, to minimise unused formulation and/or formulation which may need to be purged from the pump body 30 and discarded should it be stored beyond its maximum shelf-life. Thus, minimising the volumetric capacity of the body 30 reduces the time taken to purge the system fully and decreases the system set-up time accordingly. Additionally, minimising the total capacity allows less material to be used in constructing the housing, leading to a lighter, more compact and cheaper housing. A dynamic seal 64 is used to close the internal volume 42 of the body 30 allowing the drive shaft 52 to rotate freely whilst preventing the pressurised liquid from escaping through bearing set 54. It has been noted that the flushing of body 30 is advantageously improved by placing the inlet 22 as close as is possible to the dynamic seal 64. Placing the inlet 22 at the most opposite extreme end of internal volume 42 from a passage 62, which allows liquid formulation to pass from internal volume 42 of housing 36 into the rotor/stator assembly 32, ensures that the liquid flow in the body 30 is, so far as is possible, in one direction through the pump body. This encourages the outgoing liquid formulation to be preferentially pushed in the correct direction with reduced reliance on turbulent flow in internal volume 42 to carry the liquid formulation towards the rotor/stator 32.

The discharge end 34 of pump assembly 8 is advantageously designed also to reduce internal volume for many of the same reasons as for the pump body 30. Discharge end 34 includes a bore 66 which may receive a pressure transducer (not shown) for monitoring the pressure of liquid formulation in the discharge position. This pressure transducer may replace transducer 13 shown in FIG. 1. Having the transducer mounted in the discharge end means the transducer is removed along with the pump 8 when it is exchanged (e.g. as part of a colour change) which facilitates a quick, clean exchange of the pump 8. Liquid is discharged from the pump 8 via an outlet 68.

A link shaft 40 is arranged within housing 36 of body 30 and is arranged to connect a motor 10 (shown in FIG. 1 but not in FIG. 2) to a rotor of the rotor/stator assembly 32. The link shaft 40 is arranged within the housing so that the distance (represented as "x" between arrows in FIG. 2) between outer circular cross-section surface 44 of shaft 40 and inwardly facing circular cross-section surface 46 of housing 36 is minimised, whilst also ensuring sufficient clearance between the link shaft 40 and surface 46. Distance x may typically be less than 10 mm.

Another advantage associated with minimising distance x is apparent when the liquid formulation delivered by the apparatus is shear thinning, as is preferred. In use, the rotating link shaft 40 acts as a mixing element to some extent and, consequently, there is a tendency for liquid formulation adjacent the rotating shaft to become shear thinned and preferentially pass into the rotor/stator assembly 32; whilst liquid formulation radially further away from the shaft, may not be shear thinned and may be more viscous, with the most viscous formulation potentially being adjacent surface 46. However, by minimising distance x, the risk of the liquid formulation having significantly different viscosities radially across the housing 36 may be minimised. In addition, the arrangement described may advantageously allow substantially the entirety of liquid formulation in housing 36 to be kept turbulent by rotation of shaft 40. The aforementioned effects may facilitate exchange of liquid formulation in the housing 36 and smooth, consistent passage of liquid formulation into the rotor/stator assembly 32. Furthermore, arranging the housing so the liquid formulation is kept turbulent may allow the housing to be flushed in-situ, for example during a colour change, without leaving lumps of product in any dead corners of the housing.

In addition, associated with a desire to minimise the total capacity of the housing, the link shaft is as short as possible. For example, the link shaft may have a length of about 90 mm and a maximum diameter of about 14 mm At one end, the link shaft 40 is operatively connected, via a coupling and joint 50, to a drive shaft 52 which is supported by the bearing set 54 and is arranged to be driven by motor 10. At its other end, the link shaft 40 is operatively connected, via a coupling and joint 58, to stator 60 of rotor/stator assembly 32.

The clearance between joints 50, 58 and surface 46 of the housing 36 (distance "y" in FIG. 2) is also minimised, whilst allowing for eccentric rotation of the pump rotor relative to the driven axis. Distance y may be about 3.15 mm.

FIG. 3 shows a version of pump 8 where the link shaft 40 has an increased diameter, compared to FIG. 2. In addition, resilient gators 51 enclose the shaft. This alternative arrangement further minimises the internal volume of the pump body 30. In addition, the uniform clearance between the shaft assembly and the internal surface of the body 46 serves to reduce "hang-up" points and further improves the flushing behaviour of the pump body.

Minimisation of the internal volume 42 of the housing 36 is made possible by pressurizing liquid formulation introduced into housing 36 by pump 2. Applicant found that it was not possible to sufficiently reduce the internal volume 42 of a conventional pcp if a pump 8 was flood fed at ambient pressure. It was found that a pcp of greater internal volume was required, for efficient and consistent operation, if such a pcp was flood fed.

Pump body 30 is arranged for passage of liquid formulation from housing 36 into the rotor/stator assembly 32, via opening 62.

Assembly 32 includes multiple overlapping cavities arranged to generate a required discharge pressure, for example up to 200 bar or greater. Cavities of the pcp may suitably have volumes of about 0.08 ml, 0.25 ml or 0.85 ml. It is suitably possible to generate 3 to 4.5 bar per full cavity. An assembly 32 may be selected having 36 or 48 full cavities of substantially identical volume, with the latter having a pressure raising capacity of about 200 bar. By use of relatively small cavities, the pressure raising potential of the pcp may be optimised whilst minimising the overall size, particularly the length, of the pcp. A pcp of the type described with 36 full cavities of approx. volume 0.24 ml may have a length, between one end of the internal volume 42 of housing 36 and the outlet 68 in the discharge end 34 (distance "z" in FIG. 2), of about 460 mm; and the length of a pcp with 48 full cavities of approx. volume 0.8 ml may be about 836 mm. The length of the assembly of rotor/stator 32 would in this case be approximately 365 mm and 687 mm respectively.

Advantageously, rotor/stator assemblies 32 may be releasably securable to pump body 30 and the pump body 30 may be operable with assemblies 32 of different geometries, for example having the different lengths and capacities described.

Figure 4:
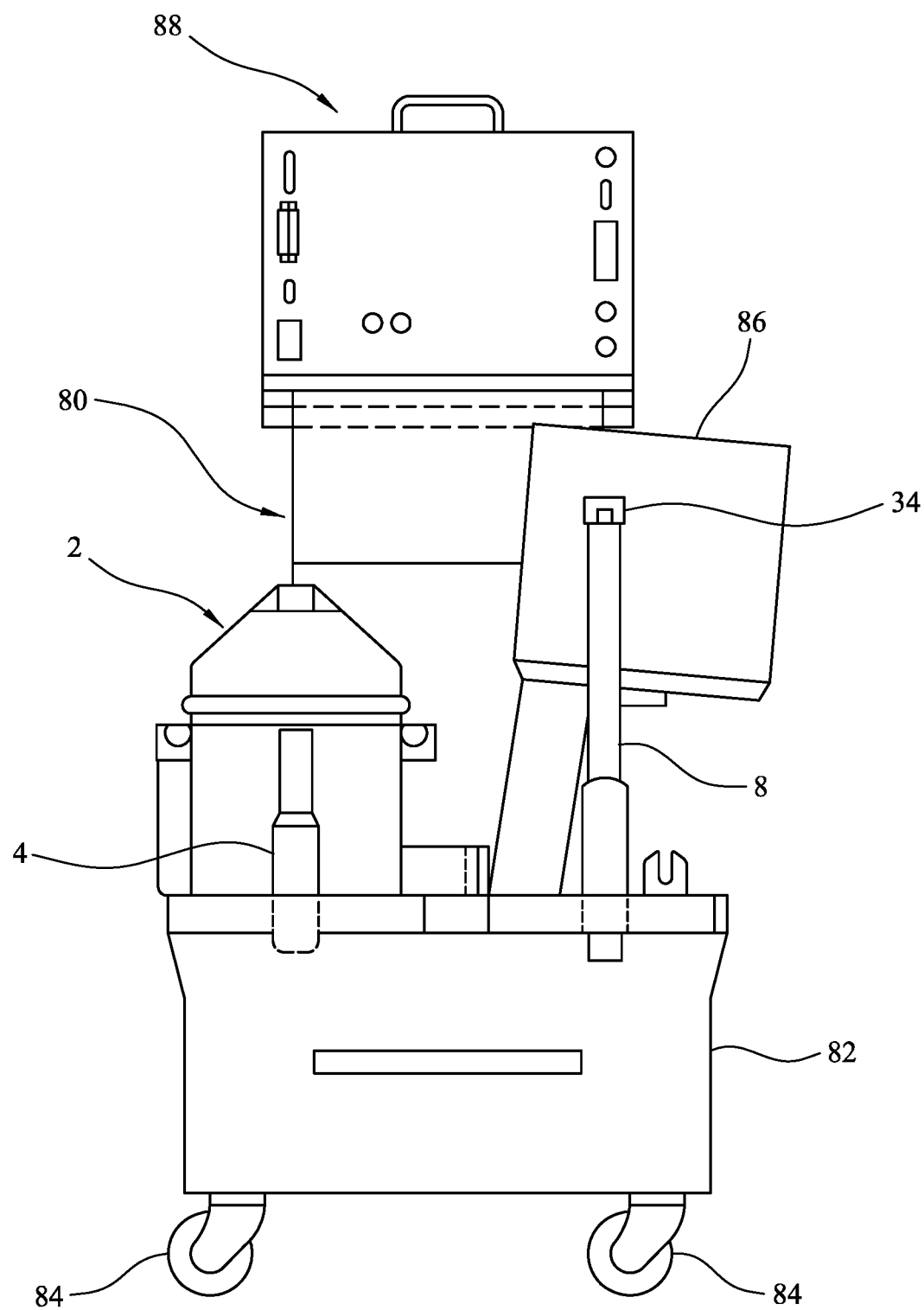
FIG. 4 is a front view of a cart which carries the apparatus, partly in cross-section.

In view of the compact arrangement of the injection apparatus described in FIGS. 1 to 3, the entire apparatus can be mounted on a cart 80 as shown in FIG. 3. Referring to the figure, the cart 80 includes a base 82 which is supported on wheels 84. Respective pcps 4 and 8 are mounted in vertical positions on the base and connected via pipework (not shown). Motors 6, 8, pressure transducers 12, 13, valve 14, actuator 16 and outlet 17 are not shown in FIG. 4; however, they are all associated and/or fixed to the cart 80. Reservoir 2 is also mounted on the cart and is arranged to deliver liquid formulation into the lower end of the pcp 4. In use, formulation passes from the upper end of pcp 4 into the lower end of pcp 8. It exits pcp 8 via discharge nozzle 34 to which a pipe (not shown) is connected for directing the liquid formulation into molten polymer present in an extruder (not shown).

The cart includes a computer and display 86 and a warning light 88 arranged to flash in the event of a malfunction or error during operation of the injection apparatus.

The cart can be wheeled to an extruder where it is desired to inject liquid formulation which minimises set-up costs and time associated with injection of liquid formulations into polymeric materials.

The cart is arranged for easy removal/replacement of the various components. For example, reservoir 2 can readily be mounted/demounted and connected to pcp 4. Similarly, pcps 4 and 8 can readily be removed and replaced as may be necessary. For example, pcp 8 may be replaced with a pcp having more or fewer stages, either by complete replacement of the pcp or by replacement of the rotor/stator assembly only of the pcp. Furthermore, operation of the injection apparatus, manipulation of cart 80, mounting/demounting of reservoir 2 and removal/replacement of pcps 4, 8 can advantageously be undertaken by one operator, unaided.

The apparatus described may be able to accurately dose formulations having viscosity in the range 5000-35000 cp, at the operating temperature of the formulation containing particles (e.g. pigments) having particle sizes of greater than 200 μm, with loadings of the particles up to 85 wt % (e.g. in the case of inorganic pigments) or up to 65 wt % (e.g. in the case of organic pigments and dyes).

It is found that the apparatus described can be used to accurately meter liquid formulations, at high pressure, into polymer in an extruder, with relatively low wear on the two pcps.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for injecting a fluid formulation into a melted polymeric material, the apparatus comprising a first progressing cavity pump (pcp) and a second pcp arranged in series in a fluid path upstream of an outlet of the apparatus wherein said apparatus is provided in combination with a melt processing apparatus, wherein said outlet of the apparatus for injecting is in fluid communication with an inlet via which fluid formulation can be introduced into a melt stream produced by said melt processing apparatus; wherein the apparatus includes a user interface by means of which a user may input process information selected from melt processing apparatus throughput, injection point pressure and LDR (Let-Down-Ratio), wherein the speed of the first pcp can be adjusted independently of the speed of the second pcp.

2. Apparatus according to claim 1, wherein said first pcp is arranged to feed liquid formulation into an inlet of the second pcp at a pressure which is greater than atmospheric pressure and is less than 500 KPa and wherein said second pcp is arranged to increase pressure by at least 19000 KPa.

3. Apparatus according to claim 1, wherein said second pcp includes a pump body having an internal volume which consists of the volume of the pump body upstream of a rotor and stator assembly of the second pcp which can contain liquid formulation introduced into the second pcp via its inlet, said internal volume being less than 200 ml;
wherein the length of the internal volume is less than 250 mm and the width is less than 75 mm; and
wherein the pump body includes a link shaft operatively connected between a rotor/stator assembly of the second pcp and a motor of the pcp, wherein said link shaft has a width of less than 25 mm.

4. Apparatus according to claim 1, wherein cavities of the first pcp and/or second pcp have a volume in the range 0.05 ml to 1.2 ml.

5. Apparatus according to claim 1, wherein said second pcp includes a rotor/stator assembly which includes at least 10 cavities, wherein the ratio of the number of cavities of a rotor/stator assembly of the second pcp divided by the number of cavities of a rotor/stator assembly of the first pcp is at least 2.

6. Apparatus according to claim 1, wherein said apparatus includes a pressure monitoring device (R) for monitoring the pressure of liquid formulation downstream of a rotor/stator assembly of the second pcp; and a pressure monitoring device (Q) for monitoring the pressure of liquid formulation upstream of said second pcp.

7. Apparatus according to claim 1, wherein said first pcp is provided upstream of the second pcp and a reservoir is upstream of the first pcp, with the reservoir being connected to the first pcp via a conduit;
wherein the reservoir is arranged to deliver fluid formulation to the inlet of the first pcp at a pressure less than 1.2 bar, wherein said apparatus is arranged to operate said first pcp so that the pressure difference between the inlet and outlet of the first pcp is less than 8 bar; and
wherein between said reservoir and said outlet of the apparatus via which fluid formulation is arranged to be delivered into a melted polymeric material, said apparatus includes only two pumps.

8. Apparatus according to claim 1, wherein said apparatus is arranged to operate said first pcp so that the pressure difference between the inlet and outlet of the first pcp is less than 8 bar; and is arranged to operate said second pcp so that the pressure difference between its inlet and outlet is greater than 10000 KPa.

9. Apparatus according to claim 1, wherein the apparatus includes a user interface by means of which a user may input process information related to melt processing apparatus throughput.

10. Apparatus according to claim 1, wherein, in said apparatus, said second pcp is mounted in an upright position and preferably said first pcp is mounted in an upright position.

11. Apparatus according to claim 1, wherein said first and second pcps are mounted on a vehicle which has an area contacting the ground of less than 1 $m^2$.

12. Apparatus according to claim 1, wherein:
(i) the apparatus includes two of said second pcps or includes one second pcp and a separate rotor/stator-assembly arranged to be interchanged with the rotor/stator-assembly of said one second pcp; or
(ii) the apparatus includes two of said first pcps which are interchangeable.

13. Apparatus according to claim 1, wherein:
said first pcp is arranged to feed liquid formulation into an inlet of the second pcp at a pressure which is greater than atmospheric pressure and is less than 500 KPa;
said second pcp includes a pump body having an internal volume which consists of the volume of the pump body upstream of a rotor and stator assembly of the second pcp which is arranged to contain liquid formulation introduced into the second pcp via its inlet, said internal volume being less than 200 ml;
cavities of the first pcp and/or second pcp have a volume in the range 0.05 ml to 1.2 ml;
said second pcp includes a rotor/stator assembly which includes at least 10 cavities;
said second pcp is arranged to increase pressure by at least 10000 KPa;
said apparatus includes a pressure monitoring device for monitoring the pressure of liquid formulation downstream of a rotor/stator assembly of the second pcp; and a pressure monitoring device for monitoring the pressure of liquid formulation upstream of said second pcp;
the ratio of the number of cavities of a rotor/stator assembly of the second pcp divided the number of cavities of a rotor/stator assembly of the first pcp is at least 2;
said first pcp is provided upstream of the second pcp and a reservoir is upstream of the first pcp, with the reservoir being connected to the first pcp via a conduit, and a storage container is arranged to deliver liquid formulation into said reservoir; and
said apparatus is provided in combination with a melt processing apparatus, wherein said outlet of the apparatus for injecting is in fluid communication with an inlet via which fluid formulation can be introduced into a melt stream produced by said melt processing apparatus.

14. Apparatus according to claim 1, wherein said first pcp is provided upstream of the second pcp and a reservoir is upstream of the first pcp, with the reservoir being connected to the first pcp via a conduit, and a storage container is arranged to deliver liquid formulation into said reservoir, wherein said storage container contains a fluid formulation which includes a vehicle which is a liquid at STP and said fluid formulation includes at least 50 wt % solids which comprise insoluble colorants which are pigments or dyes.

15. Apparatus according to claim 14, wherein said melt processing apparatus includes a melt stream of melted polymeric material.

16. Apparatus according to claim 1, wherein the apparatus is arranged to control the speed of said first pcp in dependence upon the amount of fluid formulation which it is desired to inject into the melted polymeric material wherein the function of the first pcp is to meter the fluid formulation in accordance with parameters set on a processing unit.

17. Apparatus according to claim 16, wherein the apparatus is arranged to control the speed of said second pcp automatically in dependence upon pressure assessed by a pressure monitoring device.

18. Apparatus for injecting a fluid formulation into a melted polymeric material, the apparatus comprising:
   a first progressing cavity pump (pcp) and a second pcp arranged in series in a fluid path upstream of an outlet of the apparatus;
   a pressure monitoring device for monitoring the pressure of liquid formulation downstream of a rotor/stator assembly of the second pcp; and a pressure monitoring device for monitoring the pressure of liquid formulation upstream of said second pcp;
   wherein said first pcp is provided upstream of the second pcp and a reservoir is upstream of the first pcp, with the reservoir being connected to the first pcp via a conduit;
   wherein said apparatus is provided in combination with a melt processing apparatus,
   wherein said outlet of the apparatus for injecting is in fluid communication with an inlet via which fluid formulation can be introduced into a melt stream produced by said melt processing apparatus;
   wherein the apparatus includes a user interface by means of which a user may input process information selected from melt processing apparatus throughput, injection point pressure and LDR (Let-Down-Ratio);
   wherein said first pcp and said second pcp are independently operable; and
   wherein the speed of the first pcp can be adjusted independently of the speed of the second pcp.

19. Apparatus according to claim 18, wherein a storage container is arranged to deliver liquid formulation into said reservoir, wherein said storage container contains a fluid formulation which includes a vehicle which is a liquid at STP and said fluid formulation includes at least 50 wt % solids which comprise insoluble colorants which are pigments or dyes; and wherein said melt processing apparatus includes a melt stream of melted polymeric material.

20. Apparatus for injecting a fluid formulation into a melted polymeric material, the apparatus comprising a first progressing cavity pump (pcp) and a second pcp arranged in series in a fluid path upstream of an outlet of the apparatus wherein said apparatus is provided in combination with a melt processing apparatus, wherein said outlet of the apparatus for injecting is in fluid communication with an inlet via which fluid formulation can be introduced into a melt stream produced by said melt processing apparatus; wherein the apparatus includes a user interface by means of which a user may input process information selected from melt processing apparatus throughput, injection point pressure and LDR (Let-Down-Ratio), wherein said first pcp and said second pcp are independently operable.

* * * * *